United States Patent [19]

Warner et al.

[11] Patent Number: 5,070,521
[45] Date of Patent: Dec. 3, 1991

[54] METHOD AND APPARATUS FOR CALL SOURCE IDENTIFICATION

[75] Inventors: Shawn A. Warner, Watauga; Thomas R. Moder, N. Richland Hills, both of Tex.

[73] Assignee: Motorola, Inc., Schaumburg, Ill.

[21] Appl. No.: 639,378

[22] Filed: Jan. 11, 1991

Related U.S. Application Data

[63] Continuation of Ser. No. 411,978, Sep. 25, 1989, abandoned.

[51] Int. Cl.$^5$ .......................................... H04M 11/00
[52] U.S. Cl. .................................... 379/58; 379/142; 379/63
[58] Field of Search ................... 379/57, 58, 375, 142, 379/376, 201, 63

[56] References Cited

U.S. PATENT DOCUMENTS

| | | | |
|---|---|---|---|
| 4,172,969 | 10/1979 | Levine et al. | 379/57 |
| 4,477,697 | 10/1984 | Judd et al. | 379/252 X |
| 4,646,345 | 2/1987 | Zdunek et al. | 379/62 |
| 4,658,416 | 4/1987 | Tanaka | 379/57 |
| 4,672,657 | 6/1987 | Dershowitz | 379/58 X |
| 4,748,655 | 5/1988 | Thrower et al. | 379/58 X |
| 4,776,005 | 10/1988 | Petriccione et al. | 379/142 |

*Primary Examiner*—James L. Dwyer
*Assistant Examiner*—Ahmad F. Matar
*Attorney, Agent, or Firm*—Michael J. Buchenhorner; Daniel K. Nichols

[57] ABSTRACT

Calls made to a communication unit from the telephone network include a code which can be appended as a predetermined prefix or suffix to the units address code, for alerting the operator that the call was made from the telephone network. Conversely, calls made to the communication unit from another communication unit do not include the code thereby alerting the operator that the call was made from a communication unit. The alert can be accomplished by using visual indicators or and alphanumeric display and/or can be accomplished by use of two distinct audible signal.

9 Claims, 2 Drawing Sheets

/ 1

METHOD AND APPARATUS FOR CALL SOURCE IDENTIFICATION

This is a continuation of application Ser. No. 7/411,978 filed Sept. 9, 1989 and now abandoned.

TECHNICAL FIELD

This invention relates generally to two-way radio communication systems, and particularly to such systems capable of accessing the puplic switched telephone network.

BACKGROUND ART

In some two-way communications systems, radio operators have a need to communicate with landline telephone parties, as well as other radio operators. These systems frequently employ unique individual identification (ID) codes for each radio in the system, similar to telephone number extensions in a private auto branch exchange (PABX). In this manner a level of privacy is achieved, as radio units only respond to calls directed at their unit ID.

Responding to calls initiated from landline parties typically requires the radio unit operator to manually send an "access code" signal to the interconnect device at the fixed end to establish the audio interconnection. By requiring a licensed radio unit to initiate the audio interconnection, access to the radio system from unlicensed landline callers can be resticted, thereby meeting the requirements of the Federal Communication Commission Part 90 Rules and Regulations for all applicable radio services. Responding to the radio unit initiated calls does not require this "access code" to be sent, as both parties are licensed operators on the system.

As a matter of convenience it is frequently useful to assign a common ID for receiving radio unit-initiated calls. However, because the radio unit decoder is unable to distinguish the source of the call (landline or another radio unit), the receiving radio cannot give an indication to the operator whether an "access code" needs to be sent to communicate with the caller. Accordingly, a need exists for a method to differentiate between landline-initiated and radio unit-initiated calls, and thereby, to differentiate the call-origin visually and/or audibly to the radio operator. In so doing, the operator is able to manually initiate the necessary "access code" only for landline-initiated incoming calls.

SUMMARY OF THE INVENTION

Accordingly, it is an object of the present invention to provide a method for identifying the origin of calls made to a communication unit.

Briefly, according to the invention, calls made to the communication unit from the telephone network include a code which can be appended as a predetermined prefix or suffix, for alerting the operator that the call was made from the telephone network. Conversely, calls made to the communication unit from another communication unit do not include the code thereby alerting the operator that the call was made from a communication unit. The alert can be accomplished by a visual display such as by displaying the prefix or suffix and/or can be accomplished by use of an audible signal.

DETAILED DESCRIPTION OF THE PREFERRED EMBODIMENT

Figure 1:
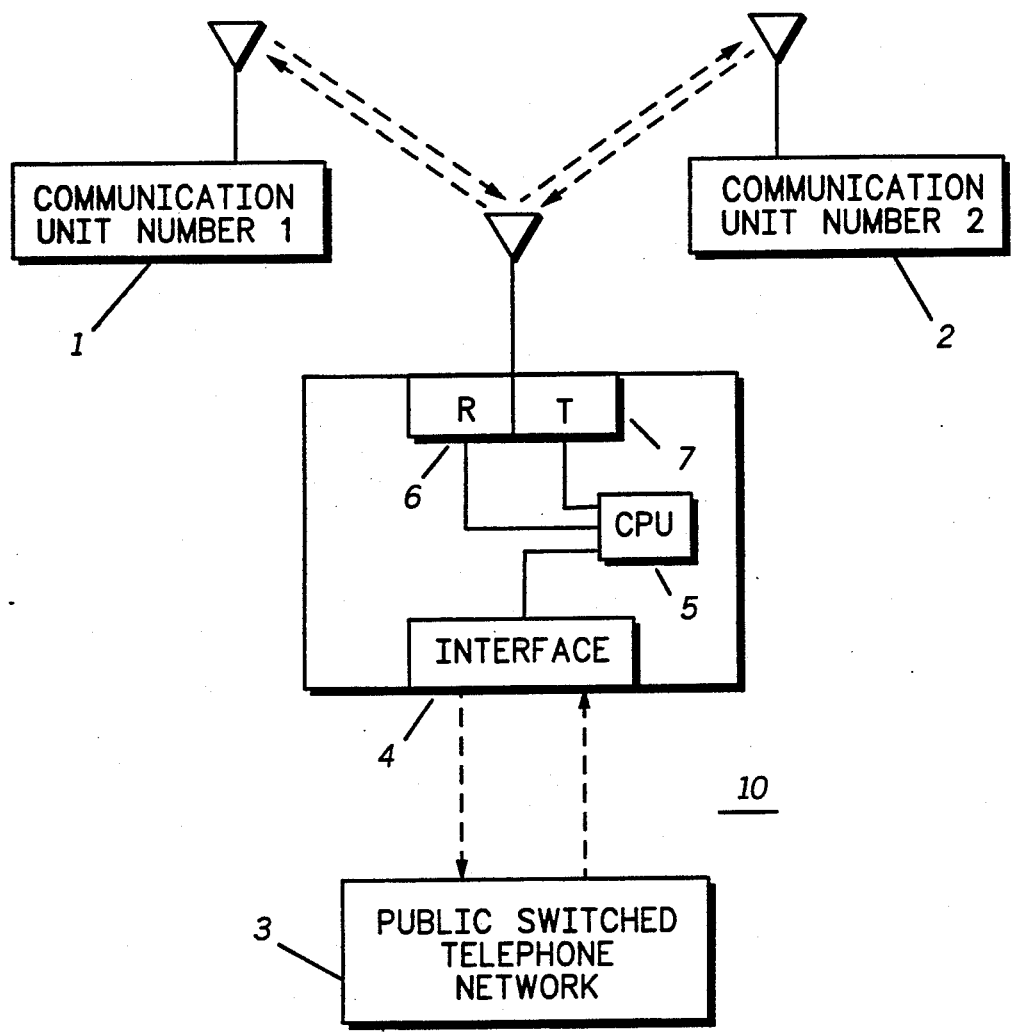
FIG. 1 is an illustration of the communication system in accordance with the present invention.

Reffering to FIG. 1, an illustration of a communication system in accordance with the present invention is shown. A communication unit 1, such as a two-way radio, is assigned an identification code, as for example, a sequence of DTMF digits. A call is made to communication unit 1 by correctly entering and transmitting its assigned identification code. Upon reception of a correct identification code, a call to a communication unit 1 is completed. Calls can be made to communication unit 1, after dialing the phone number for system access, by either another communication unit 2 or by the public switched telephone network 3. A person wishing to place a phone call to communication unit 1, enters the communication unit's identification code. The public switched telephone network transmits a signal that is received at the interface 4 of the central station 10. The cental processing unit 5, located in the central station 10, decodes the signal, identifying communication unit 1 as the recipient of the phone call. After the communication unit 1 has been identified, the signal is transmitted by transmitter 7 to communication unit 1. During the decoding of the signal in the central process unit 5, a predetermined prefix/suffix is appended to the signal, identifying the public switched telephone network as the origin of the call. When the signal is received by the communication unit 1, a distinct audio tone alerts the operator that the call was made from the public switched telphone network 3. In addition to a distinct audio tone, an alphanumeric display on the communication unit 1 may be provided to further alert the operator of the communication unit of the origin of the call (see FIG. 4). A call made by another communication unit 2 to communication unit 1 follows a similar procedure as a call made by the public switched telephone network 3 to communication unit 1. A call is placed from the communication unit 2 by entering communication unit 1's identification code. The signal is received by the central station 10 at the receiver 6. The signal is then transmitted to communication unit 1 by the transmitter 7 in the central station 10. Unlike a signal originating from the public switched telephine network 3, a predetermined prefix/suffix is not appended to the signal and is not displayed on the communication unit (see FIG. 3). A distinctive tone, distinguishable from the tone used for land-line calls, is used to alert the operator that a call was made from another communication unit.

Figure 2:
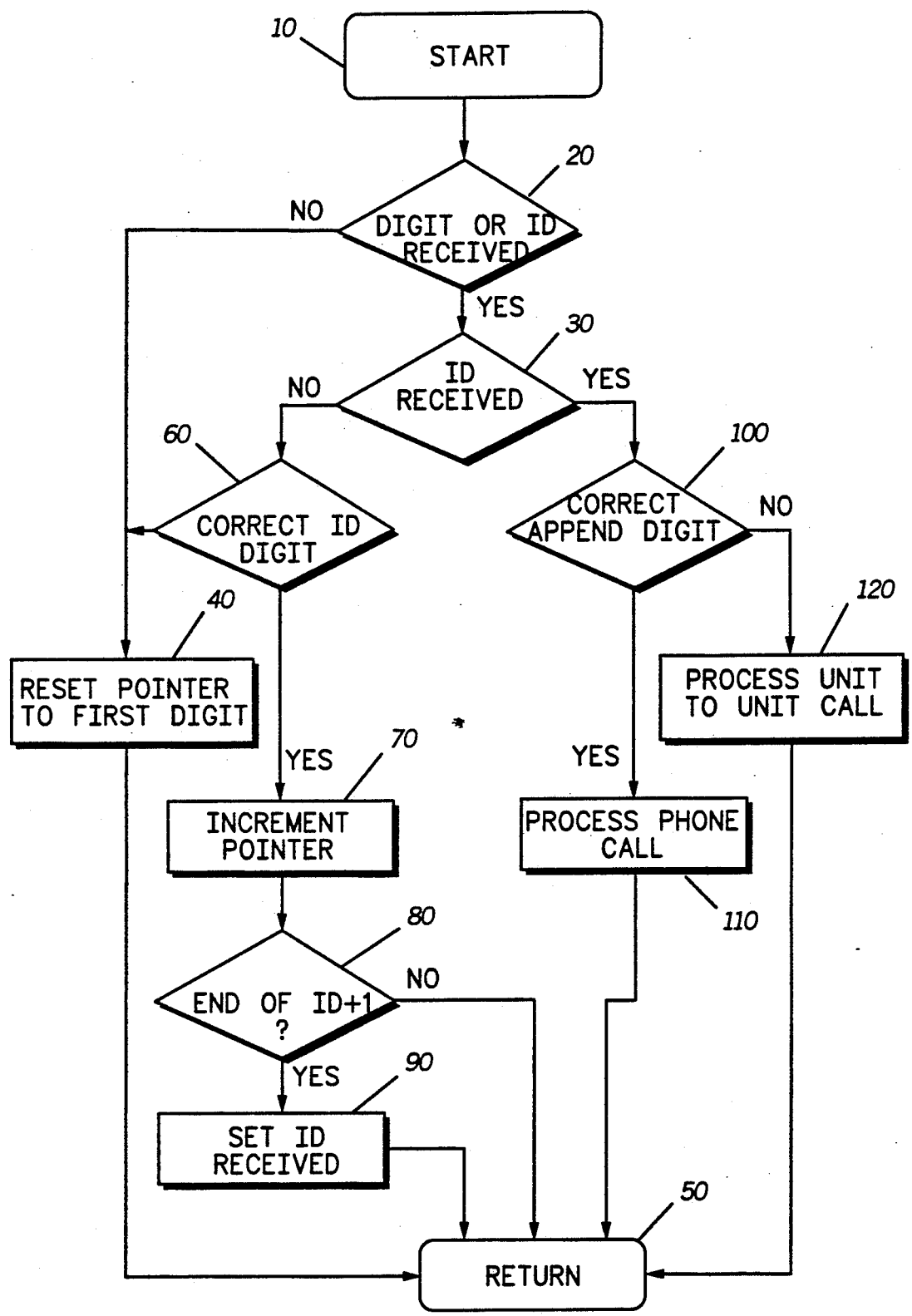
FIG. 2 is a flow-chart illustrating the method in accordance with the present invention.

Referring to FIG. 2 a flow-chart illustrating the sequence of steps for identifying the origin of a call made to the communication unit 1 is shown. The sequence begins when the communication unit receives a signal at block 10. At decision block 20, the communication unit decides whether the signal received is a digit or if the communication unit's identification code has already been received. If the signal received is not a digit and the communication unit's identification code has not been received, the pointer is reset at block 40 and the sequence returns via block 50 to start block 10 awaiting a new signal to once again initialize the sequence of steps needed for identifying the origin of a call made to the communication unit.

Conversely, if the signal received is either a digit or if the communication unit's identification code has been received, the communication unit would proceed to decision block 30 and make the determination as to whether or not the unit identification code has been recevied. An affirmative response at decision block 30 means an unit identification code has be received by the communication unit and the next step is decision block 100. A negative response at decision block 30 means a digit has been received by the communication unit and the next step is decision block 60.

Figure 3:
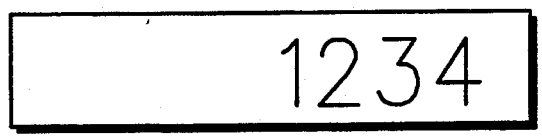
FIG. 3 is an illustration of the preferred display used to notify the operator of a communication unit that a call was made from another communication unit in accordance with the present invention.
Figure 4:
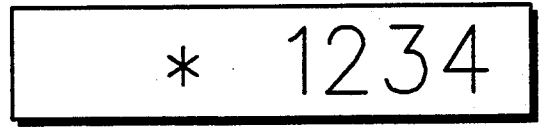
FIG. 4 is an illustration of the preferred display used to notify the operator of a communication unit that a call was made from the public phone network in accordance with the present invention.

At decision block 100, the unit identification code is examined to determine whether it includes an appended predetermined prefix/suffix. If the predetermined prefix/suffix is appended to the communication unit's identification code, then block 110 identifies the signal as a phone call originating from the public telephone network. The operator of the communication unit is alerted by a distinct audio tone and/or a visual display produced by the communication unit, as ullustrated in FIG. 4, that the phone call has orginated from the public telephone network. Alternately, if the predetermined prefix/suffix is not appended to the communication unit's identification code, then block 120 identifies the signal as a call originating from another communication unit. Unlike a signal received from a phone call, a signal from another communication unit does not produce a special visual, only a distinct tone is used to alert the operator. As illustrated in FIG. 3, The calling units ID can be displayed without the appended "*" symbol. After the communication unit identifies the origin of the call made to the communication unit, it returns to block 10 via block 50 to wait for a new signal to initialize the proceeding sequence.

Returing to decision block 30, if a digit and not the communication unit's identification code is received by the communication unit, then decision block 60 determines whether the digit correctly comprises part of the communication unit's identification code of the communication unit. If the digit received is not part of the communication unit's identification code, the pointer in the communication unit is reset at block 40 and the sequence returns via block 50 to start block 10 awaiting a new signal to once again initialize the sequence of steps needed for identifying the origin of a call made to the communication unit.

Conversely, if block 60 identifies the digit as being part of the communication unit's identification code, block 70 increments the communication unit's pointer. Decision block 80 decides if all of the digits of the communication unit's identification code have been received (determined by the pointer value being one greater than the number of digits of the ID code.) If all of the ID has been received, decision bloxk 90 sets the communication unit's identification code received flag, and returns at block 50 to block 10. The ID received flag having been set causes yes outputs at decision blocks 20 and 30. At block 100 the communication code is examined to determine whether it has originated from a public switched telephone network or another communication unit. If, instead at block 80, it has been determined that not all of the digits of the commuinication unit's identification code have been received, the communication unit returns via block 50 to block 10 and awaits the reception of addition digits that may comprise the communication units identification code.

What is claimed is:

1. A method for identifying the source of a call made to a radio communication unit, each communication having an identification code associated therewith, comprising the steps of:

at a central station:

(a) receiving a request to communicate with a radio communication unit;

(b) determining whether the request originated from another radio communication unit or from a telephone network;

(c) transmitting a signal to the radio communication unit, the signal comprising a predetermined prefix or suffix identifying the telephone network party as the origin of the call, when the call is initiated by the telephone network party, and alternatively, transmitting only the radio communication unit identification code to identify the call as originating from another radio communication unit; and at the radio communication unit:

(d) receiving a signal with the communication unit that identifies whether another radio communication unit or a telephone network party is calling.

2. The method of claim 1 further comprising the central station step of: (e) providing an indication that a signal has been received from another radio communication unit or a telephone network party.

3. The method of claim 2 wherein the central station step (e) comprises providing a distinctive audio tone and/or visual display to alert the radio communication unit that a call has been received from either a radio communication unit or a telephone network party.

4. A communication system comprising:

a telephone network;

a radio communication unit; and a central station comprising:

means for receiving a request to communicate with the radio communication unit:

means for determining whether the request orginated from another radio communication unit or from the telephone network;

means for transmitting a signal to the radio communication unit, the signal comprising a predetermined prefix or suffix identifying the telephone network party as the origin of the call, when the call is initiated by a party in the telephone network; and means for transmitting only the communication unit identification code to identify the call as originating from another radio communication unit; and the radio communication unit comprising:

means for receiving the signal transmitted by the central station; and means for determining whether another radio communication unit or a telephone network party is calling, in response to the signal transmitted by the central station.

5. The communication system of claim 4, wherein the radio communication unit further comprises:

means for providing an indication that a signal has been received from another radio communication unit or a telephone network party.

6. The communication system of claim 5, wherein the radio communication unit further comprises:

means for providing a distinctive audio tone and/or visual display to alert the radio communication unit that a call has been received from either a radio communication unit or a telephone network party.

7. In a communication system comprising a telephone network, a radio communication unit; and a central station, the radio communication unit comprising:

means for receiving a signal transmitted by the central station, the signal comprising a predetermined prefix or suffix identifying a telephone network party as the origin of the call when the call is initiated by the telephone network party; and means for determining whether another radio communication unit or a telephone network party is calling, in response to the signal transmitted by the central station.

8. The communication unit of claim 7 further comprising:

means for providing an indication that a signal has been received from another radio communication unit or a telephone network party.

9. The communication system of claim 4, wherein the radio communication unit further comprises:

means for providing a distinctive audio tone and/or visual display to alert the radio communication unit that a call has been received from either a radio communication unit or a telephone network party.

* * * * *